US012106604B2

(12) United States Patent
Jeong et al.

(10) Patent No.: US 12,106,604 B2
(45) Date of Patent: Oct. 1, 2024

(54) ELECTRONIC DEVICE AND METHOD FOR PROCESSING IMAGE BY SAME

(71) Applicant: Samsung Electronics Co., Ltd., Gyeonggi-do (KR)

(72) Inventors: Moonhwan Jeong, Gyeonggi-do (KR); Yoonsang Kim, Gyeonggi-do (KR); Sujung Bae, Gyeonggi-do (KR); Inho Choi, Gyeonggi-do (KR); Seon Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 17/571,664

(22) Filed: Jan. 10, 2022

(65) Prior Publication Data

US 2022/0130019 A1 Apr. 28, 2022

Related U.S. Application Data

(63) Continuation of application No. PCT/KR2020/011419, filed on Aug. 26, 2020.

(30) Foreign Application Priority Data

Sep. 25, 2019 (KR) .................. 10-2019-0117948

(51) Int. Cl.
*G06T 5/50* (2006.01)
*G06N 3/04* (2023.01)
(Continued)

(52) U.S. Cl.
CPC .............. *G06V 40/161* (2022.01); *G06N 3/04* (2013.01); *G06N 20/00* (2019.01); *G06T 5/50* (2013.01);
(Continued)

(58) Field of Classification Search
CPC ....... G06V 40/166; G06V 40/171; G06T 5/70
See application file for complete search history.

(56) References Cited

U.S. PATENT DOCUMENTS 9,785,796 B1 10/2017 Murphy et al.
2015/0055775 A1 2/2015 Choi et al.
(Continued)

FOREIGN PATENT DOCUMENTS

KR 10-1422290 B1 7/2014
KR 10-2015-0021280 A 3/2015
(Continued)

OTHER PUBLICATIONS

Seong, et al; "Adversarial Image Perturbation for Privacy Protection A Game Theory Perspective"; arXiv:1703.09471v2, Jul. 26, 2017; pp. 1-17; https://arxiv.org/abs/1703,09471v2.

*Primary Examiner* — Sam Bhattacharya
(74) *Attorney, Agent, or Firm* — Cha & Reiter, LLC

(57) ABSTRACT

An electronic device according to an embodiment disclosed herein may include a communication circuit, a processor; and a memory configured to be operatively connected to the processor. The memory according to an embodiment may store instructions that, when executed, cause the processor to: recognize an area comprising at least part of a face in an image to be transmitted to an external device; generate perturbation data about the recognized area based on a machine learning model stored in the memory; apply the perturbation data to the recognized area; and transmit the image to which the perturbation data has been applied to the external device. Various other embodiments are possible.

16 Claims, 11 Drawing Sheets

(51) Int. Cl.
      *G06N 20/00*       (2019.01)
      *G06T 5/70*        (2024.01)
      *G06V 40/16*      (2022.01)

(52) U.S. Cl.
      CPC .............. *G06T 5/70* (2024.01); *G06V 40/166* (2022.01); *G06V 40/171* (2022.01)

(56) References Cited

U.S. PATENT DOCUMENTS

| | | |
|---|---|---|
| 2015/0207999 A1 | 7/2015 | Han |
| 2019/0108409 A1* | 4/2019 | Zhou ..................... G06V 10/17 |
| 2020/0089995 A1* | 3/2020 | Bose ..................... G06V 10/82 |
| 2020/0356653 A1 | 11/2020 | Cho et al. |

FOREIGN PATENT DOCUMENTS

| | | |
|---|---|---|
| KR | 10-2015-0086091 A | 7/2015 |
| KR | 10-1629433 B1 | 6/2016 |
| KR | 10-2017-0001928 | 1/2017 |
| KR | 10-2019-0026560 | 3/2019 |

* cited by examiner

FIG. 6
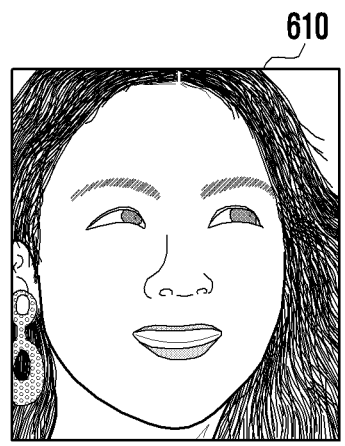
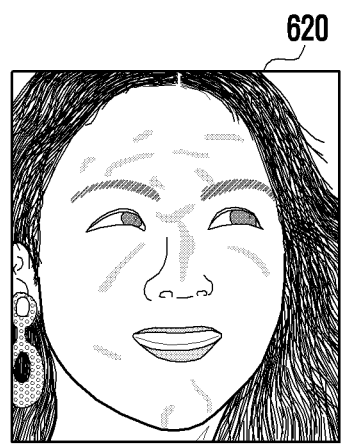
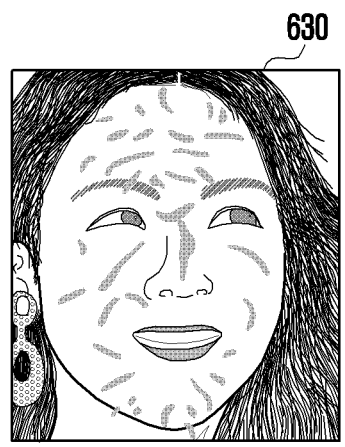

ELECTRONIC DEVICE AND METHOD FOR PROCESSING IMAGE BY SAME

CROSS-REFERENCE TO RELATED APPLICATION(S)

This application is a Continuation of and based on and claims priority under 35 U.S.C. § 120 to PCT International Application No. PCT/KR2020/011419, which was filed on Aug. 26, 2020, and claims priority to Korean Patent Application No. 10-2019-0117948, filed on Sep. 25, 2019, in the Korean Intellectual Property Office, the disclosures of which are incorporated by reference herein their entirety.

BACKGROUND

Technical Field

One or more embodiments disclosed herein generally relate to an electronic device and image processing thereof. For example, one or more embodiments disclosed herein generally relate to a device and a method for processing an image using a machine learning algorithm in an electronic device.

Description of Related Art

Artificial intelligence (AI) technology can be used to implement humanlike intelligence through computer systems and enables self-learning through machine learning algorithms. Machine learning algorithms are algorithms that autonomously classify or learn features of input data.

With the development of artificial intelligence technology, electronic devices (or machines) can autonomously analyze images using artificial intelligence technology and can classify or determine objects included in the images.

SUMMARY

As artificial intelligence technology related to image recognition has developed, electronic devices using artificial intelligence technology can collect a large number of images on the Internet in a database for machine learning. In this case, images (e.g., selfie images) including biometric information distributed on the Internet may be analyzed regardless of the intention of the persons included in the images. Further, images including biometric information may be further processed and misused (e.g., by being used in fake images).

To protect personal information included in the images, an electronic device may encrypt the images when they are stored. However, when sharing the images externally (e.g., uploading the images to a social media service (SNS) or transmitting the images through a messaging service in a non-encrypted manner over the Internet), the electronic device may decrypt the encrypted images and transmit the decrypted images to another device, and thus the personal information included in the images externally shared cannot be protected.

The electronic device may modify the image (e.g., blur the image or insert an emoticon thereinto) in order to protect the personal information included in the image. However, when the electronic device modifies the image, the image may be deteriorated or objects included in the image may be deformed so that people cannot identify the objects. Even when the electronic device inserts a watermark into the image to protect the pieces of personal information included in the image, it may be impossible to prevent misuse or abuse of the image.

An electronic device according to an embodiment disclosed herein may include a communication circuit, a processor; and a memory configured to be operatively connected to the processor. The memory according to an embodiment may store instructions that, when executed, cause the processor to: recognize an area including at least part of a face in an image to be transmitted to an external device; generate perturbation data about the recognized area based on a machine learning model stored in the memory; apply the perturbation data to the recognized area; and transmit the image to which the perturbation data has been applied to the external device.

An image processing method of an electronic device according to an embodiment disclosed herein may include: recognizing an area including at least part of a face in an image to be transmitted to an external device; generating perturbation data about the recognized area based on a machine learning model; applying the perturbation data to the recognized area; and transmitting the image to which the perturbation data has been applied to the external device.

Additional aspects will be set forth in part in the description which follows and, in part, will be apparent from the description, or may be learned by practice of the presented embodiments

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates images generated by setting different levels at which perturbation data is applied to an image according to one or more embodiments of the disclosure;

DETAILED DESCRIPTION

Certain embodiments disclosed herein disclose a device and a method for processing an image in an electronic device to prevent misuse or abuse of the image.

An electronic device according to an embodiment disclosed herein may cause malfunction of a machine learning algorithm for image recognition by adding (applying) perturbation data (adversarial perturbation data) to an image, thereby preventing misuse or abuse of the image regardless of the intention of a person included in the image.

An electronic device according to an embodiment disclosed herein may transmit a modified image obtained by adding perturbation data to an image to an external device when transmitting the image to the external device, thereby preventing misuse or abuse of the externally shared image.

An electronic device according to an embodiment disclosed herein may generate perturbation data based on a machine learning algorithm and may apply the generated perturbation data to an image, thereby causing malfunction of the machine learning algorithm with only a modification that is so insignificant that a human cannot visually recognize the modification.

Figure 1:
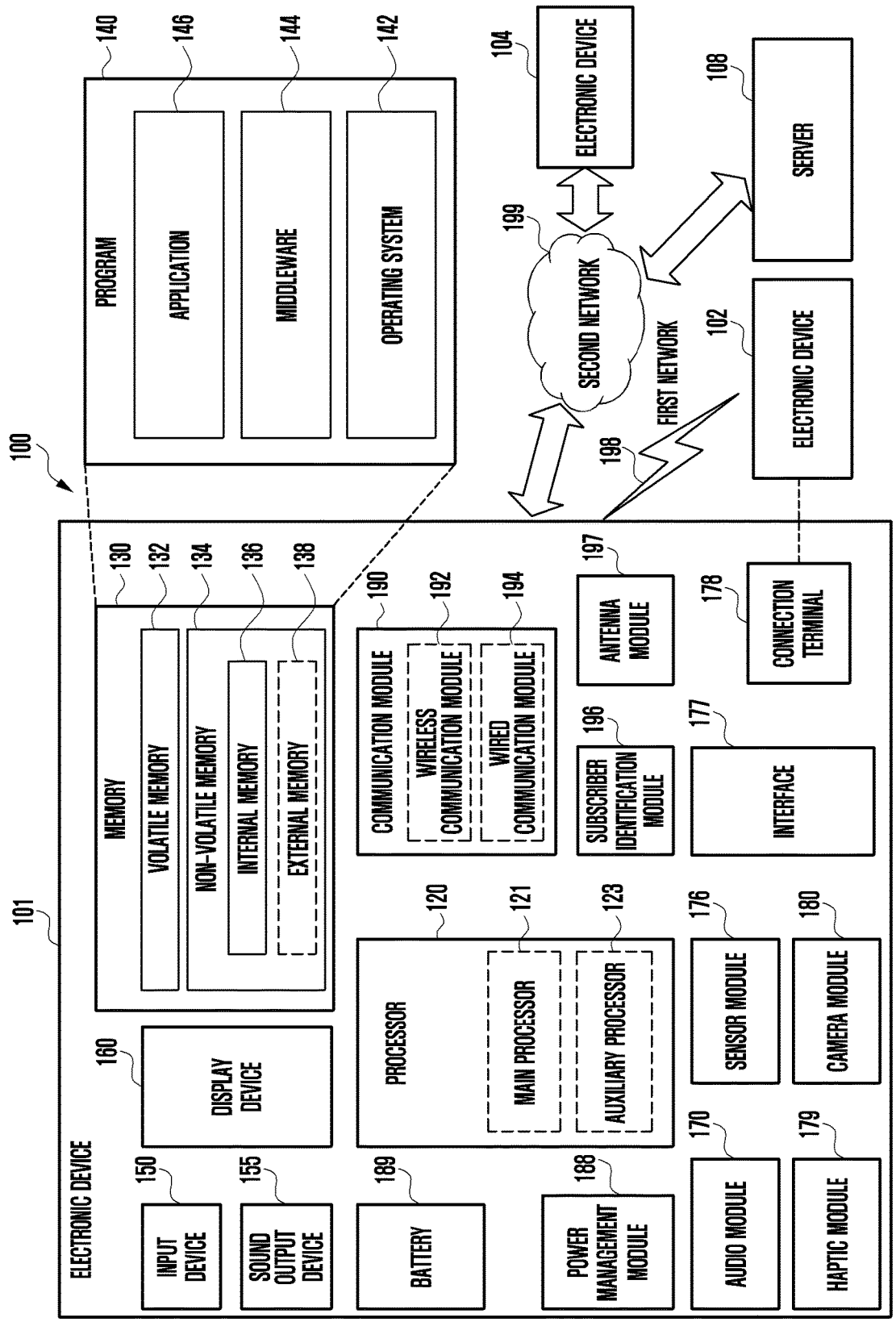
FIG. 1 is a block diagram of an electronic device in a network environment according to an embodiment of the disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190 (e.g. communication circuitry, whether wired or wireless), a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The memory 134 may further include internal memory 136 and/or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
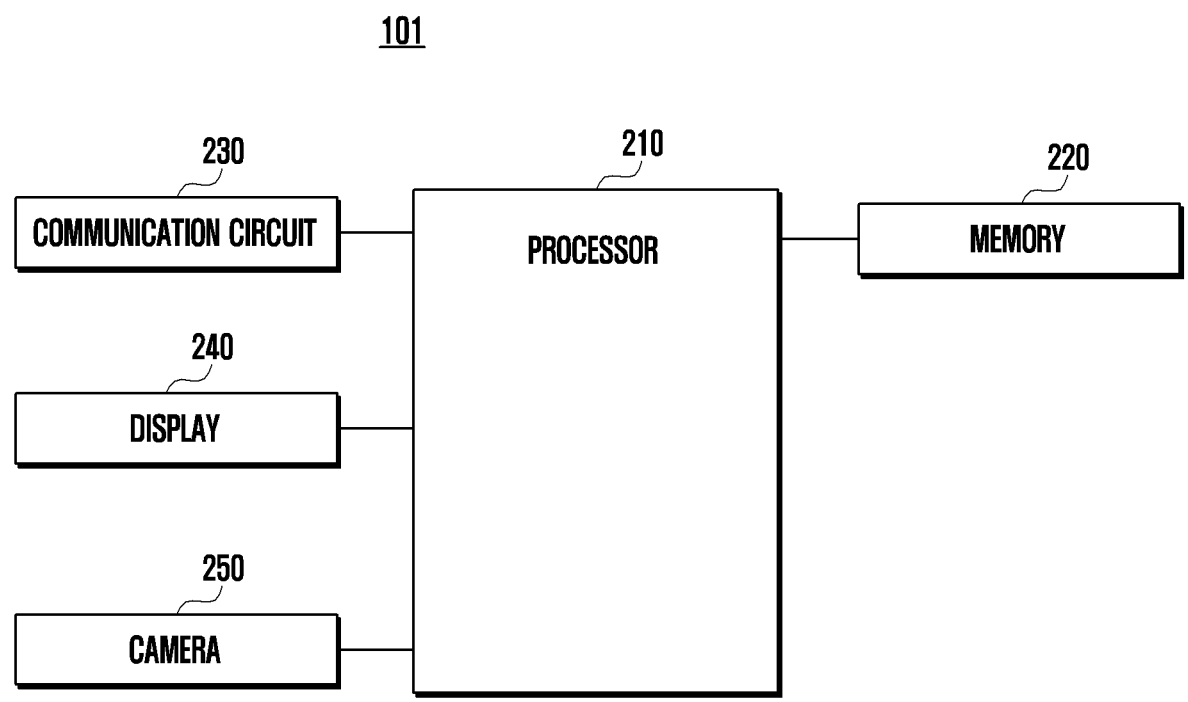
FIG. 2 is a block diagram of an electronic device according to an embodiment of the disclosure.

FIG. 2 is a block diagram of an electronic device according to an embodiment of the disclosure.

Referring to FIG. 2, the electronic device 101 according to an embodiment may include a processor 210 (e.g., the processor 120 of FIG. 1), a memory 220 (e.g., the memory 130 of FIG. 1), a communication circuit 230 (e.g., the communication module 190 of FIG. 1), a display 240 (e.g., the display device 160 of FIG. 1), and/or a camera 250 (e.g., the camera module 180 of FIG. 1). When some of the components illustrated in FIG. 2 are omitted or substituted, one or more embodiments disclosed herein can be implemented without difficulty for one of skill in the art.

According to an embodiment, the processor 210 may be a component capable of performing operations or data processing related to control and/or communication of each component of the electronic device 101. For example, the processor 210 may be operatively connected to components of the electronic device 101 (e.g., the memory 220, the communication circuit 230, the display 240, and/or the camera 250). The processor 210 may load a command or data received from a different component of the electronic device 101 into the memory 220, may process a command or data stored in the memory 220, and may store resulting data. The processor 210 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the memory 220 may store instructions for an operation of the processor 210. According to an embodiment, the memory 220 may store at least one machine learning model.

According to an embodiment, the communication circuit 230 may establish a communication channel with an external device (e.g., the electronic device 102 or the electronic device 104 of FIG. 1) and may transmit and receive various data to and from the external device. According to an embodiment, the communication circuit 230 may be configured to include a cellular communication module and to be connected to a cellular network (e.g., Third Generation (3G), Long-Term Evolution (LTE), Fifth Generation (5G), Wibro, or Wimax). According to an embodiment, the communication circuit 230 may include a short-range communication module and may transmit and receive data to and from the external device using short-range communication (e.g., Wi-Fi, Bluetooth, Bluetooth Low Energy (BLE), or ultra wideband (UWB)), but is not limited thereto.

According to an embodiment, the communication circuit 230 may include a contactless communication module for contactless communication. For example, the contactless communication may include at least one contactless short-range communication technology such as near-field communication (NFC), radio frequency identification (RFID) communication, or magnetic secure transmission (MST) communication.

According to an embodiment, the display 240 may display various screens based on control of the processor 210. According to an embodiment, the camera 250 may obtain an image by capturing a still image or a video.

When transmitting an image stored in the memory 220 of the electronic device 101 to the external device, the processor 210 according to an embodiment may transmit, instead of the original image, an image (modified image or merged image) processed such that incorrect image recognition will be performed through a machine learning model. According to an embodiment, the image may include a picture or a video. According to an embodiment, the image stored in the memory 220 may include an image obtained and stored through the camera 250 and/or an image received and stored from the external device.

The processor 210 according to an embodiment may recognize an area including at least part of a face in the image to be transmitted to the external device. According to an embodiment, the processor 210 may recognize the area including the at least part of the face in the image to be transmitted to the external device, based on a machine learning model. For example, the processor 210 may receive a user input to transmit some of images stored in the electronic device 101 to the external device. For example, transmitting an image to the external device may include uploading an image to a social networking service (SNS) (transmitting the image to an SNS server device), transmitting an image to a different user through a messaging service, or uploading an image to an Internet home page, and may include any case of transmitting (or sharing) an image stored in the electronic device 101 to the external device in addition to the above case. The processor 210 may recognize the area including the at least part of the face in the image in response to a request to transmit the image to the external device. For example, the processor may recognize an entire face area and/or an area including part of the face in the image.

According to an embodiment, the processor 210 may recognize an area including at least one of an eye area, a wrist area, or a fingerprint area in the image. For example, the processor 210 may recognize the area including the at least one of the eye area, the wrist area, or the fingerprint area in the image to be transmitted to another device, based on a machine learning model. In addition to the above areas, any area on which image recognition can be performed may be included. Hereinafter, for convenience of explanation, the case of recognizing a face area will be described.

The processor 210 according to an embodiment may generate perturbation data (perturbation, adversarial perturbation, or adversarial example) about a recognized face area, based on a machine learning model. For example, the perturbation data may be a pattern or noise for causing malfunction of the machine learning model. For example, the perturbation data may be a pattern or noise added to the original image in order to deceive the machine learning model for learned image recognition. For example, the perturbation data may be a random small value. For example, the perturbation data may be a value having a pixel value range (e.g., 0 to 5) of $\frac{1}{50}$ or less of the pixel value range (e.g., 0 to 255) of the original image. An image to which perturbation data is applied may cause malfunction of a classification model, a pose estimation model, or a semantic segmentation model of the machine learning model. For example, the image to which the perturbation data is applied may have low recognition accuracy due to incorrect classification of the type, species, or gender of an object (e.g., human) included in the image through the machine learning model. For example, the processor 210 may generate perturbation data about the face area based on the image of the recognized face area recognized using the machine learning model. For example, the perturbation data may include a pattern or noise generated according to the image input to the machine learning model. Among terms described in certain embodiments of the disclosure, a security filter may refer to perturbation data.

According to an embodiment, machine learning is a field of artificial intelligence and may include various machine learning methods for realizing a function, such as human learning ability, in the electronic device 101 (e.g., a computer). A machine learning model may include a deep learning model based on an artificial neural network. For example, the machine learning model include a deep neural network (DNN), a recurrent neural network (RNN), a convolutional neural network (CNN), a generative adversarial network (GAN), a machine learning model for classification-regression analysis (e.g., a support vector machine (SVM)), or a reinforcement learning (RL) model. For example, the machine learning model may be a generator (e.g., a GAN generator) of an encoder-decoder type based on a convolution neural network.

The processor 210 according to an embodiment may generate perturbation data to be applied to the original image or may generate a new image resulting from application of a modification (perturbation) to the original image using a machine learning model learned based on a model learned by at least one machine learner. The machine learning model according to an embodiment may be stored in the memory 220.

The generator based on the convolutional neural network according to an embodiment may have various types of network structures. For example, the generator may include a U-Net with an encoder-decoder based on a convolution. The generator may generate perturbation data based on information learned from images. The perturbation data may be applied to the original image, thereby generating a modified image (or a merged image) corresponding to the original image. Alternatively, the generator may generate a new image based on information learned from images. The new image generated by the generator may be an image that imitates the original image and has a modification (perturbation).

When a generative adversarial network (GAN) is used as the convolutional neural network, the machine learning model according to an embodiment may include a generator and a discriminator.

An image modified by the processor 210 (e.g., the generator) according to an embodiment may be an image that is difficult to distinguish from the original image with the human naked eye and causes malfunction of the machine learning model.

A reinforcement learning model according to an embodiment may generate perturbation data about the image and then update the perturbation data through reinforcement learning. The reinforcement learning model may generate state information and reward information about the perturbation data generated by the generator through the discriminator. The generator may update the perturbation data based on the state information and the reward information generated by the discriminator. For example, the state information may refer to information about a currently given state. For example, the reward information may be information that can be obtained when a specific action is made in the currently given state. For example, the information about the currently given state may include the extent of modification of the modified image compared to the original image or the recognition accuracy of the modified image. For example, when a reward information value is small, the processor 201 may determine that the generator is not properly operating and may increase variance when the perturbation data is updated through the generator. For example, defining the extent of modification of the modified image compared to the original image as d, the reward information may be expressed as $\Delta d$. The processor 210 may update the extent of modification of the image using the reward information. Equation 1 is an equation for updating the extent of modification.

$$d' = +\Delta d \qquad \text{[Equation 1]}$$

The processor 210 according to an embodiment may generate perturbation data about an image based on at least one machine learning model.

The processor 210 according to an embodiment may generate perturbation data about an area including at least part of a face recognized from an image based on at least one machine learning model. When the processor 210 generates the perturbation data about the area including the at least part of the face, the processing speed of the machine learning model may be improved compared to the case of generating perturbation data for the entire image.

The processor 210 according to an embodiment may apply the perturbation data to the area including the at least part of the face recognized in the image. For example, the processor 210 may apply the perturbation data to the area including the at least part of the face recognized in the image based on a preset application level.

The processor 210 according to an embodiment may transmit the image to which the perturbation data has been applied to the external device. The processor 210 according to an embodiment may temporarily or permanently store the image to which the perturbation data has been applied in the memory 220.

The processor 210 according to an embodiment may display the image to which the perturbation data has been applied and the recognition accuracy of the image to which the perturbation data has been applied on the display 240 before transmitting the image to which the perturbation data has been applied to the external device. The electronic device 101 (or the processor 210) may display the image to which the perturbation data has been applied and the recognition accuracy of the image to which the perturbation data has been applied on the display 240 before transmitting the image to which the perturbation data has been applied to another device so that the user of the electronic device 101 can recognize information about the image to be transmitted to the external device. For example, the user of the electronic device 101 may recognize the information about the image to be transmitted to the external device, thereby recognizing the extent of the modification of the image to be transmitted to the external device.

The processor 210 according to an embodiment may extract an area including at least part of a face from an image and may then apply perturbation data to the original image, thereby generating a merged image. For example, the processor 210 may recognize an area including at least part of a face in an image. The processor 210 may extract the area including the at least part of the face. The processor 210 may generate perturbation data about the area including the at least part of the face based on a machine learning model to which extraction information is applied. The processor 210 may apply the perturbation data, generated based on the machine learning model, to the extracted area. The processor 210 may merge the area to which the perturbation data has been applied and the original image. The processor 210 may transmit the merged image to the external device. For example, the merged image may be temporarily or permanently stored in the memory 220.

The processor 210 according to an embodiment may adjust a level at which perturbation data is applied to an image. For example, the processor 210 may set a level (e.g., an application level) at which perturbation data is applied to an original image based on a user input. For example, the processor 210 may determine a level at which perturbation data is applied based on the type of the external device to which an image is to be transmitted. For example, the processor 210 may analyze an image and may determine a level at which perturbation data is applied to the original image based on an object (e.g., a user) identified in the image.

According to an embodiment, when an image is used in the electronic device 101 (e.g., a Gallery application), the processor 210 may use and display the original image. When transmitting the image to the external device, the processor 210 may transmit the image to which perturbation data has been applied (e.g., a merged image) to the external device.

Figure 3:
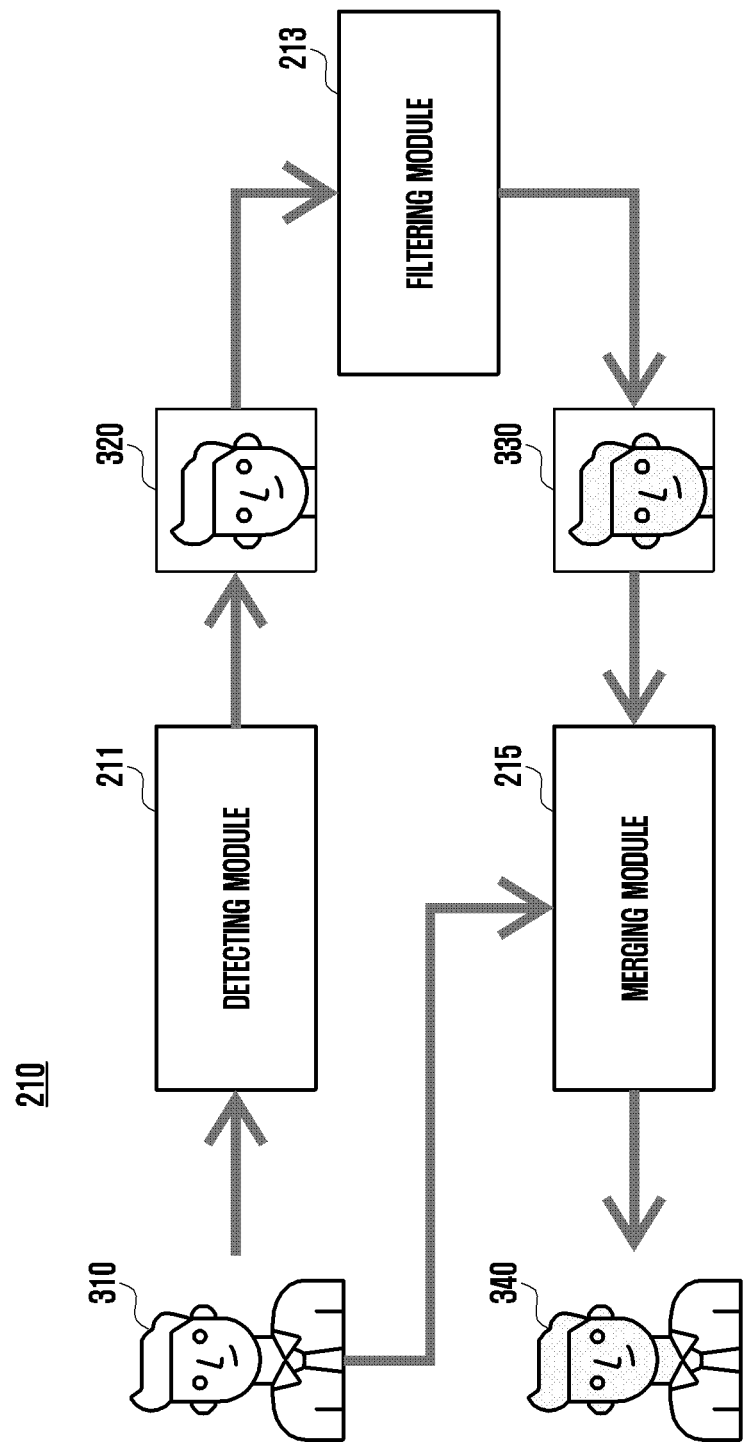
FIG. 3 illustrates a method for processing an image according to an embodiment of the disclosure.

FIG. 3 illustrates a method for processing an image according to an embodiment of the disclosure.

Referring to FIG. 3, the processor 210 according to an embodiment may include a detecting module 211 and a filtering module 213. The processor 210 according to an embodiment may further include a merging module 215. The detecting module 211, the filtering module 213, and the merging module 215 may be software modules.

The detecting module 211 according to an embodiment may recognize (or detect) an area including at least part of a face in an image 310 (e.g., an original image) input to the detecting module 211. The detecting module 211 may extract the area 320 including the at least part of the face recognized in the image 310. The detecting module 211 may be a deep learning-based single shot multibox detector (SSD) module. According to an embodiment, the detecting module 211 may recognize at least one of an eye area, a wrist area, or a fingerprint area in addition to the face area. In an embodiment illustrated in this drawing, for convenience of explanation, the case of recognizing a face area will be described.

The filtering module 213 according to an embodiment may generate perturbation data about the image 310 based on at least one machine learning model and may apply the perturbation data to at least part of the image 310 (e.g., a face area 320) to thereby generate a modified image. For example, the filtering module 213 may generate perturbation data about the face area 320 recognized by the detecting module 211 and may apply the perturbation data to the face area 320 recognized by the detecting module 211. According to an embodiment, when the detecting module 211 extracts the face area 320, the filtering module 213 may generate the perturbation data about the face area 320 and may apply the perturbation data to the extracted face area 320. The operation of the filtering module 213 applying the perturbation data to the face area 320 may be referred to as an operation of applying a security filter to prevent misuse of the image. For example, the filtering module 213 may generate the perturbation data about the face area 320 extracted by the detecting module 211, based on at least one of the generator of an encoder-decoder type based on a convolutional neural network, a deep neural network (DNN), a recurrent neural network (RNN), a convolutional neural network (CNN), a generative adversarial network (GAN), a machine learning algorithm for classification-regression (support vector machine, SVM), or a reinforcement learning (RL) algorithm. Hereinafter, although the machine learning model will be described with reference to the generator of the encoder-decoder type based on the convolutional neural network as an example, it is apparent to those having ordinary skill that the disclosure can be performed using various different machine learning models.

The filtering module 213 according to an embodiment may apply the perturbation data to the face area 320 recognized by the detecting module 211 to prevent misuse of biometric information, thereby modifying at least part (e.g., the face area 320) of the image 310. The modification of the image can be applied by adding the perturbation data having a pixel value of [−k, k] to the original image. The generator of the encoder-decoder type based on the convolutional neural network may be trained to minimize loss ($L_G$).

For example, the loss ($L_G$) of the generator may include three types of losses as shown in Equation 2.

$$L_G = L_{D\_fake} + L_{adv} + L_{pert} \quad \text{[Equation 2]}$$

According to an embodiment, $L_{D\_fake}$ may denote the loss from the difference between the original image and the modified image (merged image). In GAN-based learning, the generator may perform adversarial learning with a discriminator that distinguishes whether the image is the original image or the image to which the perturbation data has been applied. As the difference between the original image and the modified image becomes insignificant, $L_{D\_fake}$ may decrease.

According to an embodiment, $L_{adv}$ may denote the loss associated with the extent to which the image to which the perturbation data has been applied causes malfunction of a machine learning-based recognizer (e.g., a face detector or a gender/age/face recognizer). As the extent to which the malfunction caused by the image with perturbation data increases, $L_{adv}$ may decrease.

According to an embodiment, $L_{pert}$ may denote a value indicating the size of the perturbation data. As the size of the perturbation data increases, $L_{pert}$ may decrease.

The generator according to an embodiment may be trained to reduce the difference between the image to which the perturbation data has been applied and the original image (to reduce the value of $L_{D\_fake}$), to reduce the image recognition accuracy of the machine learning model for the image to which the perturbation data has been applied (to reduce the value of $L_{adv}$), and to reduce the size of the perturbation data (to reduce the value of $L_{pert}$).

According to an embodiment, the perturbation data may have a pattern to cause the malfunction of the machine learning model for image recognition or face detection. The pattern may be applied to the original image lightly and naturally at a level that is difficult to distinguish with the human naked eye. The operation of applying the perturbation data to the original image may be based on Equation 3.

$$\hat{p} = \tan h(w * \text{perturb} + P) \quad \text{[Equation 3]}$$

According to an embodiment, the pixel value P of the original image may be normalized to a range of [−1, 1]. The perturbation data (perturb) may be added to P with a weight (w) adjusted depending on purpose of use and performance. The pixel value of the original image to which the perturbation data has been added may be clipped to a value of [−1, 1] through a tank function or a min/max function.

The filtering module 213 according to an embodiment may divide an interest area and a non-interest area of a human based on an attention map method and may be trained to generate perturbation data in the non-interest area of the human. For example, the attention map method may be a neural network method for implementing human visual attention. For example, the filtering module 213 may analyze the image 310, may then determine a pupil, a beard, hair, or the periphery of a face as a non-interest area of the human, and may generate perturbation data in the determined non-interest area.

According to an embodiment, the user of the electronic device 101 may set a level (e.g., an application level) at which perturbation data is applied. As the application level relatively increases, the probability of malfunction of the machine learning model for image recognition may also increase. For example, the user of the electronic device 101 may adjust the size of the pixel value of the perturbation data by adjusting the application level. For example, when the application level of the perturbation data is set to be relatively low, the electronic device 101 may generate perturbation data having a pixel value range (e.g., 0 to 2) of 1/100 of the pixel value range (e.g., 0 to 255) of the original image and may apply the perturbation data to the original image. For example, when the application level of the perturbation data is set to be relatively high, the electronic device 101 may generate perturbation data having a pixel value range (e.g., 0 to 25) of 1/10 of the pixel value range of the original image and may apply the perturbation data to the original image.

The synthesis module 215 according to an embodiment may merge a face area 330 to which the perturbation data has been applied and the image 310, thereby generating a merged image 340. For example, the merging module 215 may merge the face area 330 to which the perturbation data has been applied and the original image 310 and may then process a boundary area between the two so that the boundary appears to be natural. For example, the merging module 215 may process a color change to be natural in image merging.

The merging module 215 according to an embodiment may have an encoder-decoder structure based on a convolutional neural network. According to an embodiment, the merging module 215 may be trained to minimize loss ($L_M$).

According to an embodiment, the loss ($L_M$) of the merging module 215 may include two types of losses as shown in Equation 4.

$$L_M = L_f + L_h \quad \text{[Equation 4]}$$

According to an embodiment, $L_f$ may denote a loss from the extent of change of the extracted face area. The merging module 215 may be trained to minimize the value of $L_f$. $L_f$ may be measured by Equation 5.

$$L_f = |\widehat{F_f} + M_f|_k \quad \text{[Equation 5]}$$

According to an embodiment, $\widehat{F_f}$ is values of an image of the face area output through the filtering module 213, and $M_f$ is values of an image of the face area in the merged image output through the merging module 215. The difference between the two images may be measured through L1 normalization (least absolute shrinkage and selection operator: LASSO) or L2 normalization.

According to an embodiment, $L_h$ may denote a loss from the extent of change of the boundary area. The merging module 215 may be trained to minimize the value of $L_h$. $L_h$ may be measured by Equation 6.

$$L_h = |h(M_b) - h(M_n)|_k \quad \text{[Equation 6]}$$

According to an embodiment, h( ) may be a function for measuring a histogram. Equation 6 may represent the histogram difference between the boundary area ($M_b$) and the peripheral area thereof ($M_n$). According to an embodiment, pixel value difference may be used instead of the histogram difference.

The processor 210 according to an embodiment may transmit the merged image 340, output through the merging module 215, to an external device through the communication circuit 230.

Although FIG. 3 includes exaggerated perturbation to emphasize that the perturbation data has been applied to the face area of the merged image 340 output through the merging module 215 and that the merged image is different from the original image, the merged image and the original image cannot actually be distinguished with the naked eye of the user, or may have only very subtle distinguishable differences therebetween.

Figure 4:
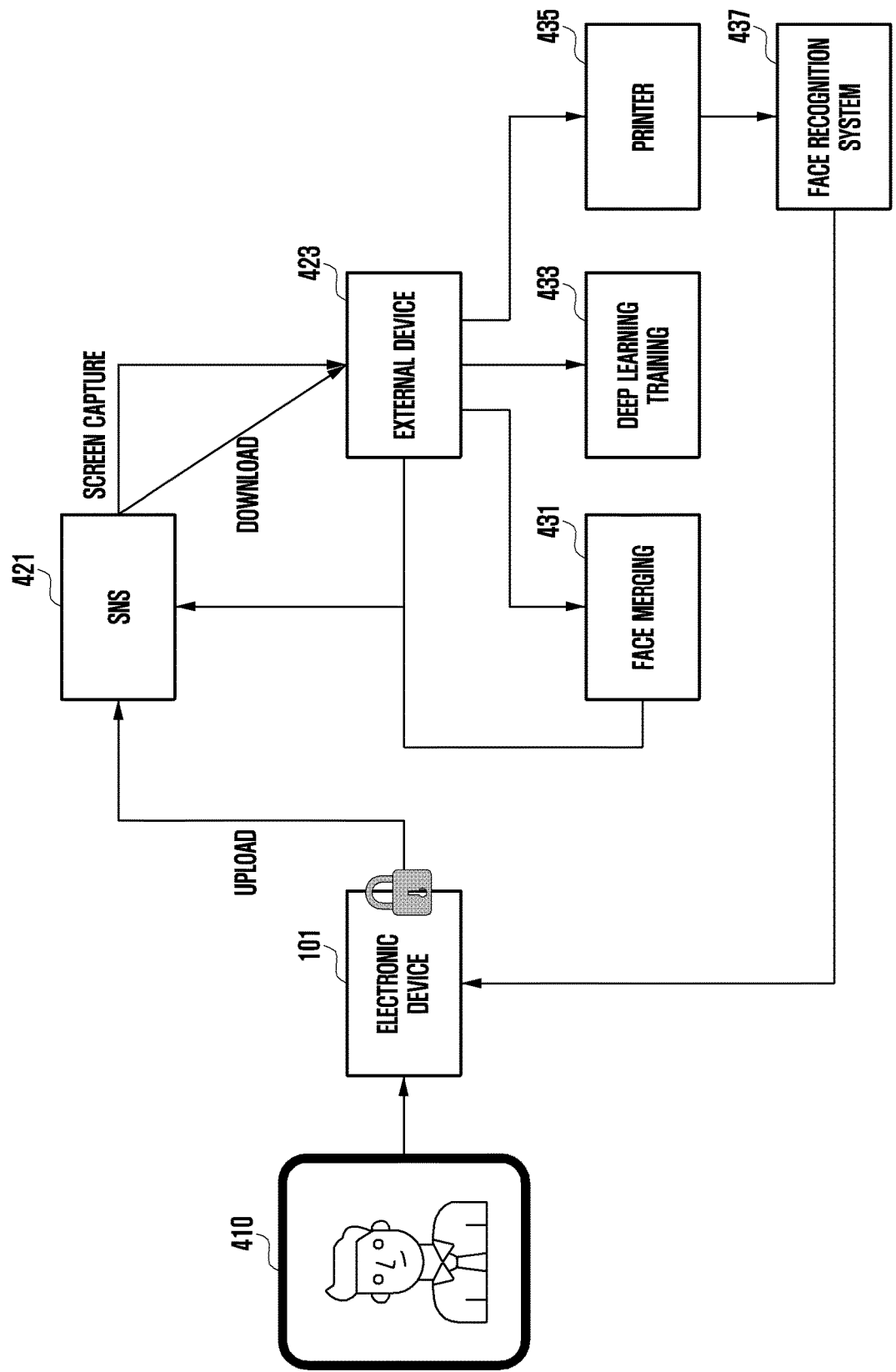
FIG. 4 illustrates an environment in which an image transmitted to an external device is used according to an embodiment of the disclosure.

FIG. 4 illustrates an environment in which an image transmitted to an external device is used according to an embodiment of the disclosure.

Referring to FIG. 4, when transmitting an image to an external device, the electronic device 101 according to an embodiment may transmit a modified image corresponding to an original image, thereby preventing the image from being misused or being abused regardless of the intention of the user of the electronic device 101.

According to an embodiment, the electronic device 101 may upload an image 410 to an SNS server 421. For example, the image uploaded to the SNS server 421 may be a modified image corresponding to an original image 410. For example, the modified image may include an image in which perturbation data has been applied to the original image 410. Although the SNS server 421 is illustrated in an embodiment disclosed in this drawing, the disclosure may be applied to various external devices which the image is transmitted to or shared with.

According to an embodiment, the image uploaded to the SNS server 421 may be transmitted to an external device 423 via downloading or screen capturing. For example, the image transmitted to the external device 423 may be used for face merging (e.g., face change) 431. For example, the image transmitted to the external device 423 may be collected for training of a deep learning model 433 for face recognition. For example, the image transmitted to the external device 423 may be printed through a printer 435 and may be used in a device (e.g., a mobile phone or an ATM) to which a face recognition system is applied.

According to an embodiment, the electronic device 101 may upload the modified image corresponding to the original image 410 to the SNS server 421, thereby preventing misuse or abuse of the image using the foregoing methods (431, 433, and/or 435). For example, when the modified image (e.g., the image to which the perturbation data has been applied) is input to the deep learning model 433 for face recognition, the image causes malfunction, thus preventing the image from being misused regardless of the user's intention.

When transmitting or sharing an image to or with an external device (e.g., the SNS server 421), the electronic device 101 according to an embodiment may transmit or share a modified image in which perturbation data is applied to the original image, thereby preventing abuse or misuse of the image regardless of the intention of the user of the electronic device 101.

Figure 5A:
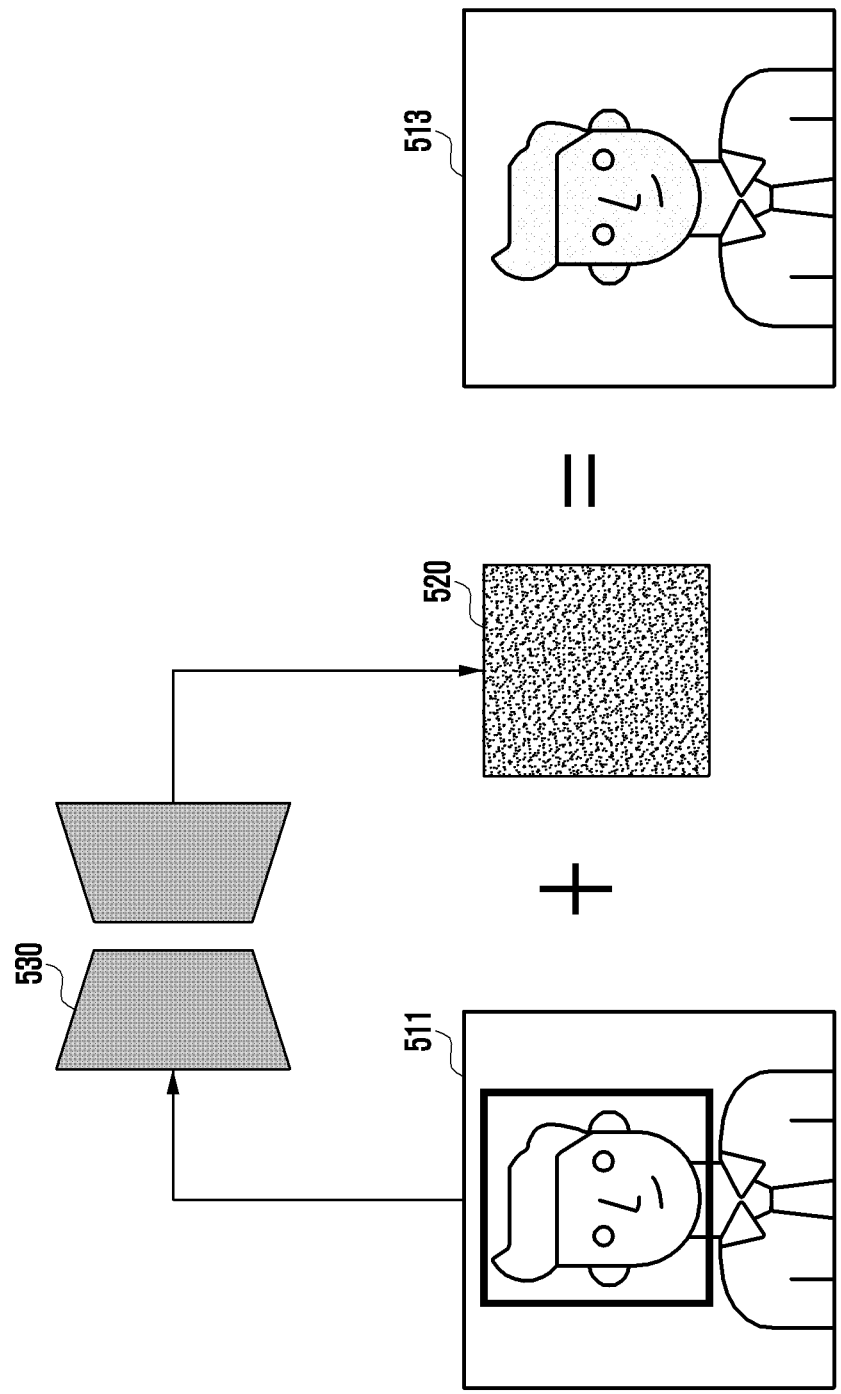
FIG. 5A and FIG. 5B each illustrate a method for generating an image by applying perturbation data to an image according to an embodiment of the disclosure.
Figure 5B:
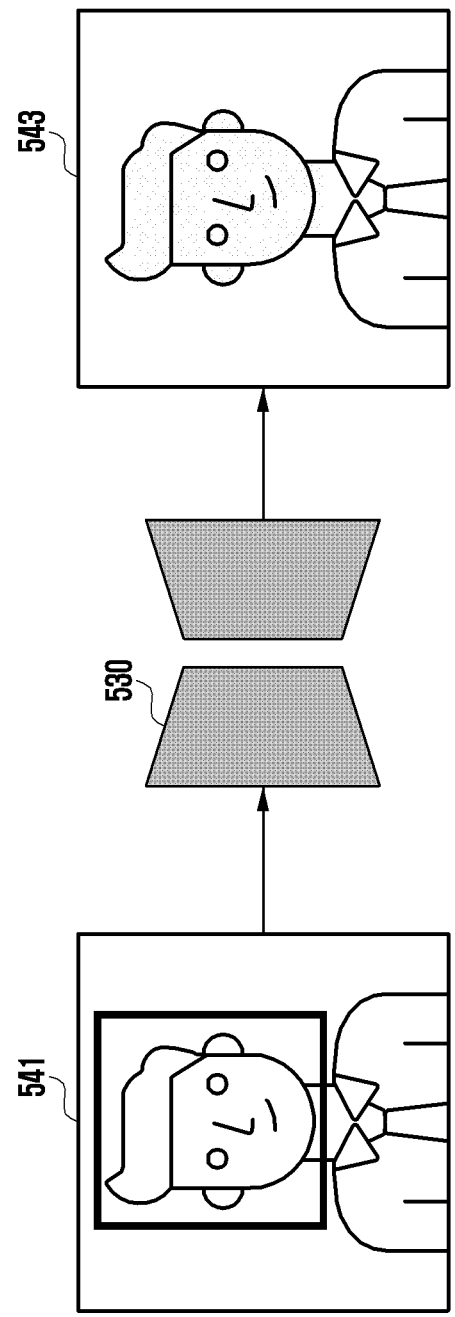

FIG. 5A and FIG. 5B each illustrate a method for generating an image by applying perturbation data to an image according to an embodiment of the disclosure. For example, perturbation data 520 may be implemented as a security filter for preventing misuse or abuse of biometric information included in an image. The perturbation data 520 is not limited to the pattern illustrated in FIG. 5A, and at least one of the spacing, size, or shape of the pattern may be changed according to the application level.

Referring to FIG. 5A, the processor 210 according to an embodiment may recognize a face area in an original image 511. The processor 210 may generate perturbation data 520 about the face area. The perturbation data 520 may be applied to the face area recognized in the original image 511. According to an embodiment, the processor 210 may generate perturbation data 520 corresponding to the entire original image 511 and apply the perturbation data 520 to the entire original image 511. According to an embodiment, the processor 210 may recognize at least one of an eye (iris) area, a wrist area, or a fingerprint area included in the original image 511. In an embodiment illustrated in this drawing, for convenience of explanation, the case of recognizing a face area will be described.

The processor 210 according to an embodiment may generate the perturbation data 520 by inputting the face area recognized in the original image 511 into a machine learning model 530.

According to an embodiment, the processor 210 may extract the face area recognized in the original image 511. The processor 210 may generate perturbation data 520 about the face area extracted from the original image 511 and apply the perturbation data 520 to the face area extracted from the original image 511. The processor 210 may merge the face area to which the perturbation data 520 has been applied and the original image 511. For example, a modified image 513 may be an image obtained by applying the perturbation data 520 to the face area of the original image 511. When the modified image 513 is input to the machine learning model for image recognition, the modified image may cause malfunction of the machine learning model. For example, as a result of analyzing the modified image 513, the machine learning model may not be able to recognize that the object included in the modified image 513 is a person, may recognize the object included in the image as a different person, or may misrecognize the gender of the person.

According to an embodiment, the modified image 513 to which the perturbation data has been applied is not significantly different from the original image 511 as perceived by the naked human eye but may cause malfunction of the machine learning model for image recognition.

Referring to FIG. 5B, the processor 210 according to an embodiment may generate a modified image by directly modifying the original image based on a machine learning model, rather than separately generating perturbation data and applying the perturbation data to the original image.

The processor 210 according to an embodiment may generate a modified image 543 by inputting an original image 541 to be transmitted to an external device into the machine learning model 530. For example, the modified image 543 may be an image that is obtained by applying modification to at least a portion included in the original image 541 to causes malfunction of the machine learning model for face recognition.

FIG. 6 illustrates images generated by setting different levels at which perturbation data is applied to an image according to one or more embodiments of the disclosure.

Referring to FIG. 6, a first image 610 may refer to a modified image (or merged image) when the level (e.g., application level) at which perturbation data is applied is set to a relatively low value. A second image 620 may refer to a modified image when the level at which the perturbation data is applied is set to an intermediate value. In one example, the application level set to the intermediate value may be relatively higher than the application level of the first image 610 and may be relatively lower than the application level of a third image 630. The third image 630 may refer to a modified image when the level at which the perturbation data is applied is set to a relatively high value. Although the first image 610, the second image 620, and the third image 630 are shown as being exaggeratedly modified to emphasize differences therebetween, the actual modified images and an original image cannot be distinguished with the naked eye of the user, or may have only very subtle distinguishable differences therebetween.

According to an embodiment, the image recognition rate of a machine learning model may relatively decrease as the level of the perturbation data relatively increases. For example, it may be assumed that the first image 610 is a modified image generated by applying the perturbation data to the original image at an application level of 0.5. In this case, when the first image 610 is input, the machine learning model may determine the gender of a person included in the original image with an accuracy of 76.14%.

For example, it may be assumed that the second image 620 is a modified image generated by applying the perturbation data to the original image at an application level of 0.8. In this case, when the second image 620 is input, the machine learning model may determine the gender of a person included in the original image with an accuracy of 25.96%.

For example, it may be assumed that the third image 630 is a modified image generated by applying the perturbation data to the original image at an application level of 1.1. In this case, when the third image 630 is input, the machine learning model may determine the gender of a person included in the original image with an accuracy of 6.59%.

According to an embodiment, the electronic device 101 may relatively increase the probability of occurrence of malfunction of the machine learning model for image recognition as the application level of perturbation data is relatively increased.

The processor 210 according to an embodiment may set the level (e.g., application level) at which the perturbation data is applied to the original image based on a user input. For example, the user may adjust the application level through parameter setup. For example, the processor 210 may display a user interface (UI) (e.g., a Seek Bar) for setting the application level on the display 240. The processor 210 may set the level at which the perturbation data is applied to the original image based on a user input via the user interface displayed on the display 240.

The processor 210 according to an embodiment may determine the level (e.g., application level) at which perturbation data is applied to the original image based on the type of an external device to which the image is to be transmitted or an application (e.g., the application 146 of FIG. 1). For example, when it is determined that the image is to be uploaded to SNS that can be accessed by an unspecified number of people, the processor 210 may upload, to the SNS, an image generated by applying perturbation data to the original image at a relatively high application level.

For example, when it is determined that the image is to be transmitted to an external device of a friend through a messaging service, the processor 210 may transmit a modified image, generated by applying perturbation data to the original image at a relatively low application level, to the external device through the messaging service.

The processor 210 according to an embodiment may analyze an image and may determine the level (e.g., application level) at which perturbation data is applied to the original image based on a user identified in the image. For example, when it is determined that a person identified in an image is the user of the electronic device 101, the processor 210 may apply perturbation data to the original image at a relatively high application level.

For example, when it is determined that the person identified in the image is a person other than the user of the electronic device 101, the processor 210 may apply the perturbation data to the original image at a relatively low application level.

Figure 7:
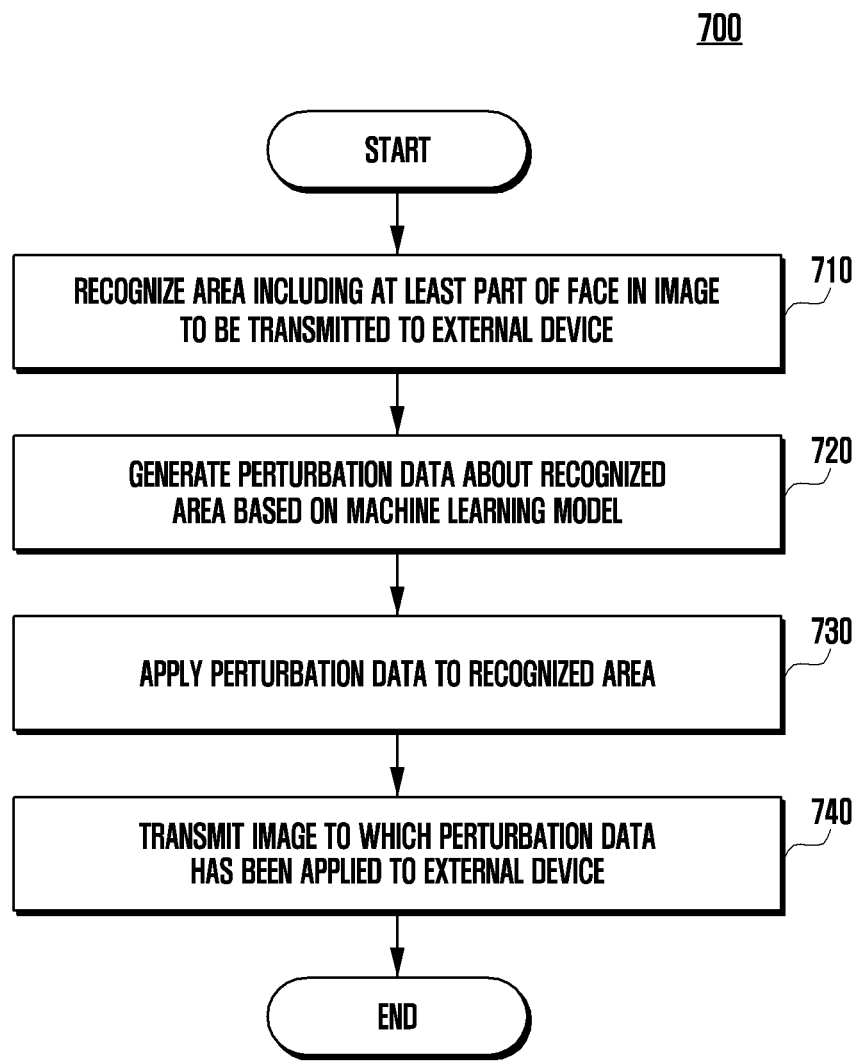
FIG. 7 is an operation flowchart of an electronic device according to an embodiment of the disclosure.

FIG. 7 is an operation flowchart of an electronic device 101 according to an embodiment of the disclosure.

Referring to the operation flowchart 700, in operation 710, a processor (e.g., the processor 210 of FIG. 2) of the electronic device 101 according to an embodiment may recognize an area including at least part of a face in an image to be transmitted to an external device. For example, the processor 210 may analyze an image based on a machine learning model for image recognition or a computer vision-based algorithm and may recognize an area including at least part of a face or the entire face.

According to an embodiment, the processor 210 may also recognize an area (e.g., an eye (iris) area, a wrist area, and/or a fingerprint area) that can be used for biometric authentication in addition to the area including the at least part of the face. The processor 210 according to an embodiment may recognize various types of areas other than the foregoing areas.

In operation 720, the processor 210 according to an embodiment may generate perturbation data about the area recognized in the image based on the machine learning model. For example, the perturbation data may be a pattern or noise to cause malfunction of the machine learning model.

In operation 730, the processor 210 according to an embodiment may apply the perturbation data to the area recognized in the image.

In operation 740, the processor 210 according to an embodiment may transmit the image to which the perturbation data has been applied to the external device.

Figure 8:
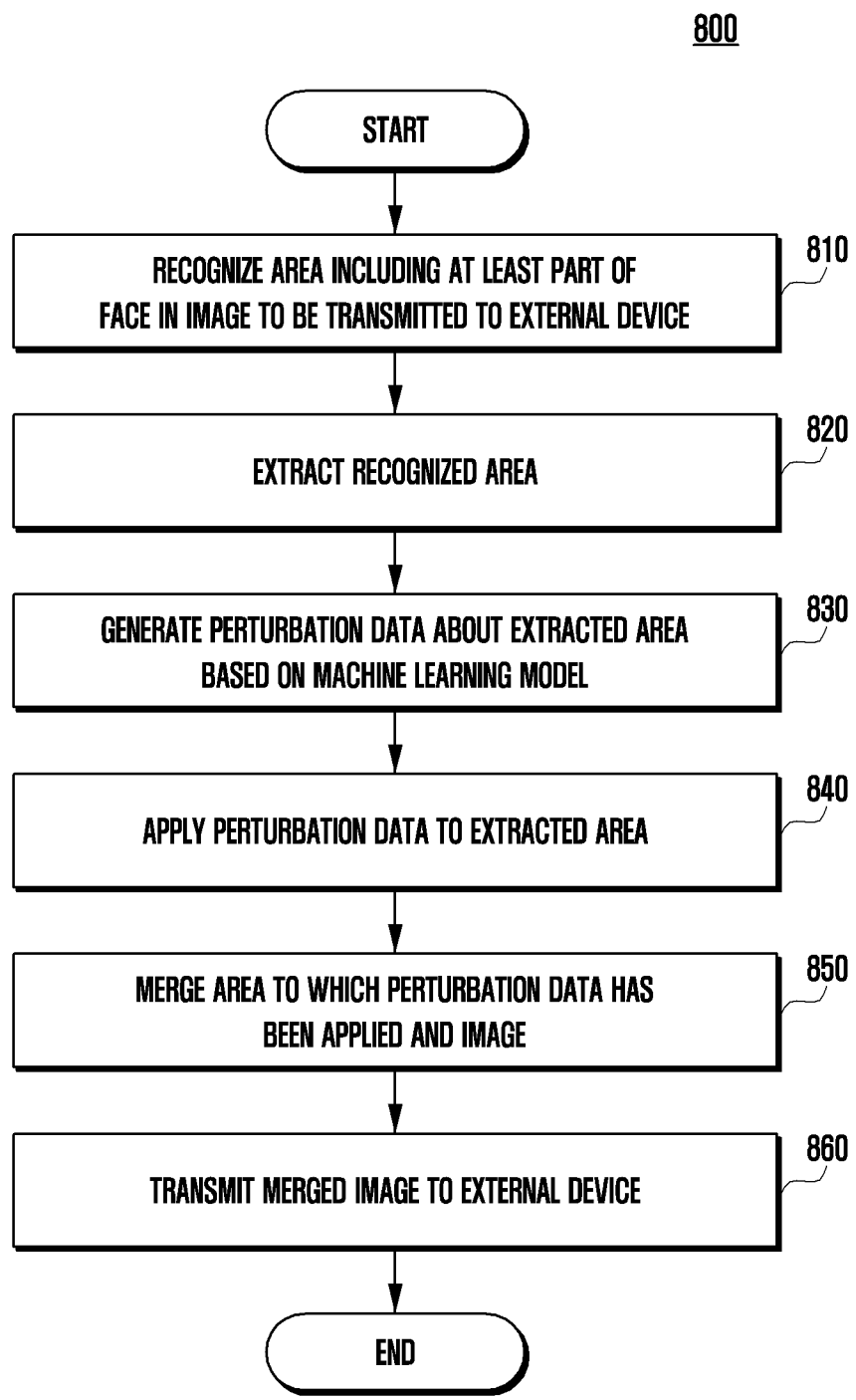
FIG. 8 is an operation flowchart of an electronic device according to an embodiment of the disclosure.

FIG. 8 is an operation flowchart of an electronic device according to an embodiment of the disclosure. Details overlapping with those explained in FIG. 7 will be omitted.

Referring to the operation flowchart 800, in operation 810, a processor (e.g., the processor 210 of FIG. 2) of the electronic device 101 according to an embodiment may recognize an area including at least part of a face in an image to be transmitted to an external device. In another example, the processor 210 may recognize an area including the entire face in the image to be transmitted to the external device.

In operation 820, the processor 210 according to an embodiment may extract the area including the at least part of the face recognized in the image. For example, the processor 210 may separate the area including the at least part of the face recognized in the image from the image.

In operation 830, the processor 210 according to an embodiment may generate perturbation data about the extracted area based on a machine learning model.

In operation 840, the processor 210 according to an embodiment may apply the perturbation data to the face area extracted from the image.

In operation 850, the processor 210 according to an embodiment may merge the face area to which the perturbation data has been applied and the image, thereby generating a single merged image.

In operation 860, the processor 210 according to an embodiment may transmit the merged image to the external device.

Figure 9:
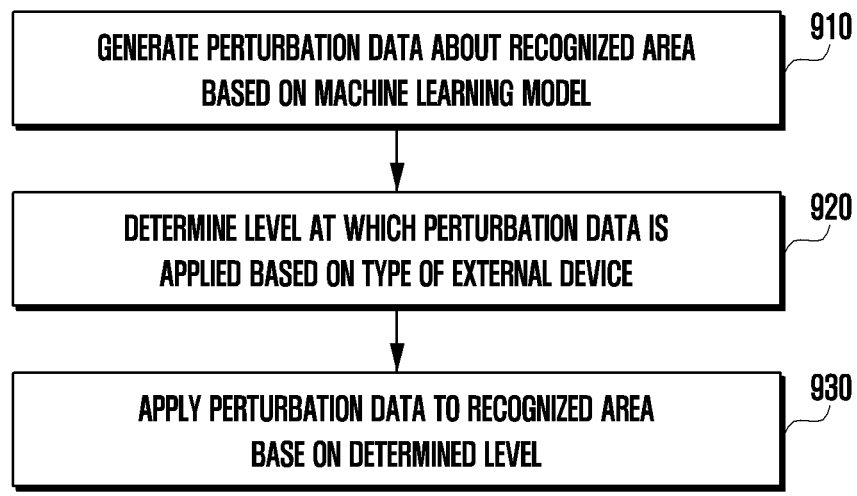
FIG. 9 is an operation flowchart of an electronic device according to an embodiment of the disclosure.

FIG. 9 is an operation flowchart of an electronic device according to an embodiment of the disclosure. Specifically, FIG. 9 is an operation flowchart illustrating a method for applying perturbation data to an image according to an embodiment. Details overlapping with those explained in FIG. 7 and FIG. 8 will be omitted.

Referring to the operation flowchart 900, in operation 910, a processor 210 according to an embodiment may generate perturbation data about an area including at least part of a face recognized in an image based on a machine learning model. For example, operation 910 may be the same operation as operation 720 of FIG. 7 or operation 830 of FIG. 8.

In operation 920, the processor 210 according to an embodiment may determine the level at which the perturbation data is applied based on the type of the external device, for example. For example, when the external device is an SNS server device, the processor 210 may set the level at which the perturbation data is applied to be relatively high. For example, when the external device is a device registered to a friend of the user, the processor 210 may set the level at which the perturbation data is applied to be relatively low.

The processor 210 according to an embodiment may determine the level at which the perturbation data is applied based on a user input detected through a user interface (e.g., a Seek Bar) related to setup of the application level of the perturbation data. The processor 210 according to an embodiment may determine the level at which the perturbation data is applied based on the type of an object recognized in the image. For example, when the object included in the image is recognized as a human, the processor 210 may set the level at which the perturbation data is applied to be relatively high. For example, when the object included in the image is recognized as an animal, the processor 210 may set the level at which the perturbation data is applied to be relatively low.

In operation 930, the processor 210 according to an embodiment may apply the perturbation data to the area including the at least part of the face recognized in the image based on the level (e.g., application level) at which the perturbation data is applied.

Figure 10:
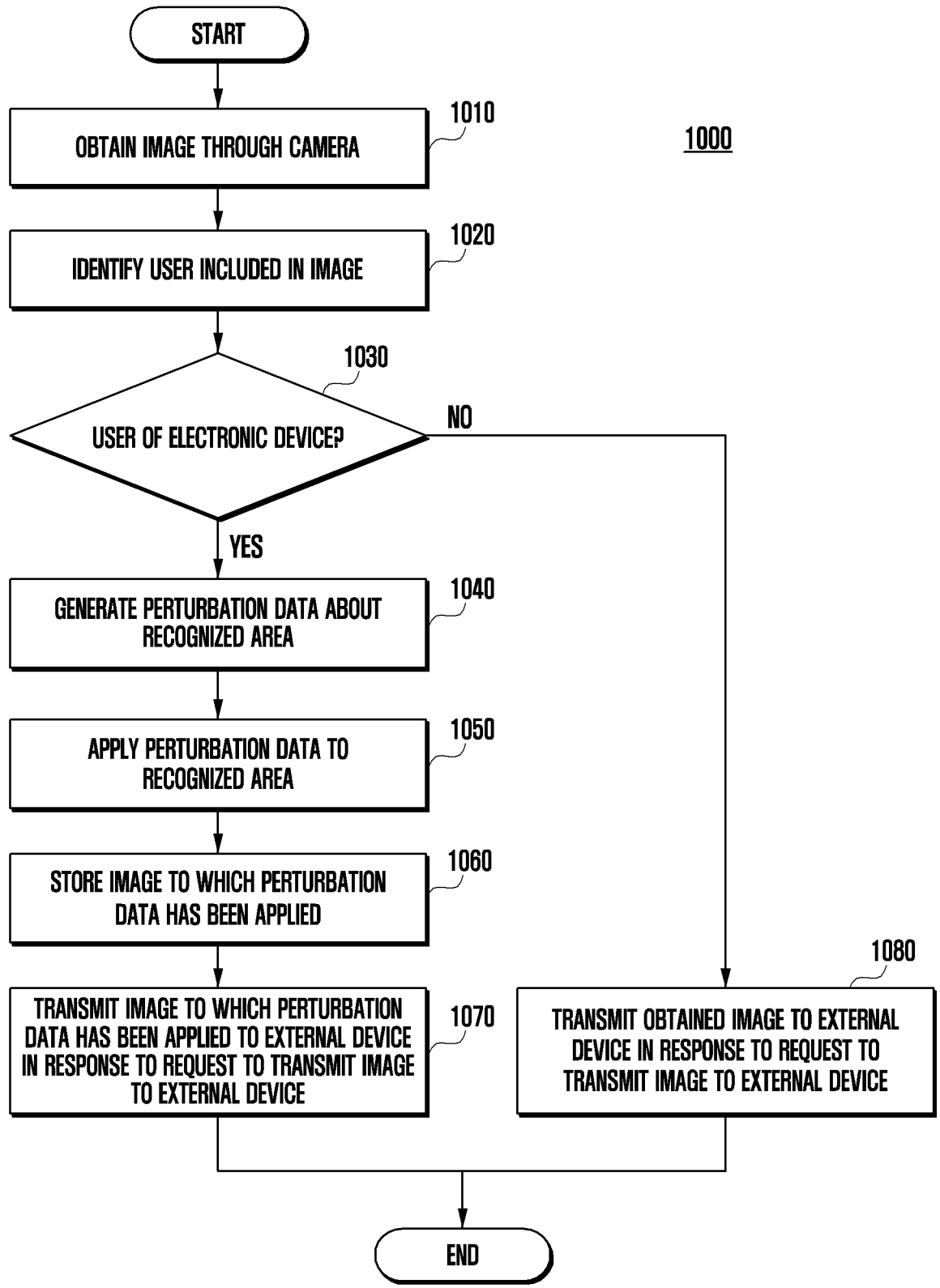
FIG. 10 is an operation flowchart of an electronic device according to an embodiment of the disclosure.

FIG. 10 is an operation flowchart of an electronic device according to an embodiment of the disclosure.

When an image is obtained through a camera (e.g., the camera 250 of FIG. 2), a processor (e.g., the processor 210 of FIG. 2) according to an embodiment may generate a modified image in advance by applying perturbation data to the original image obtained through the camera 250. The processor (e.g., the processor 210) may store the modified image along with the original image obtained through the camera (e.g., the camera 250) in a memory (e.g., the memory 220 of FIG. 2). When a request to transmit the original image to an external device is made, the processor (e.g., the processor 210) may transmit the modified image stored in the memory (e.g., the memory 220) to the external device.

Referring to the operation flowchart 1000, in operation 1010, the processor 210 of the electronic device 101 according to an embodiment may obtain an image through the camera 250.

In operation 1020, the processor 210 according to an embodiment may identify a user by recognizing an area including at least part (e.g., a face, an iris, or a fingerprint) of the user included in the image obtained through the camera 250.

In operation 1030, the processor 210 according to an embodiment may determine whether the user identified in the image is the user of the electronic device 101. For example, the processor 210 may compare the image obtained through the camera 250 and an image of the user of the electronic device 101 previously stored in the electronic device 101 and may determine whether the user included in the image obtained through the camera 250 is the user of the electronic device 101.

According to an embodiment, when it is determined that the user included in the image is not the user of the electronic device 101 (No in operation 1030), the processor 210 may transmit the image obtained through the camera 250 to the external device in response to a request to transmit the image obtained through the camera 250 to the external device in operation 1080.

According to an embodiment, when it is determined that the user included in the image is the user of the electronic device 101 (Yes in operation 1030), the processor 210 may generate perturbation data about the image obtained through the camera 250 in operation 1040. For example, the processor 210 may identify an area including at least part (e.g. face) of the user in the image obtained through the camera 250. The processor 210 may generate perturbation data about the area including the at least part of the user. For example, the area including the at least part of the user may include a face area, an eye (iris) area, a wrist area, and/or a fingerprint area.

In operation 1050, the processor 210 according to an embodiment may apply the perturbation data to the area including the at least part of the user recognized in the image.

In operation 1060, the processor 210 according to an embodiment may store the image (e.g., a modified image) to which the perturbation data has been applied. For example, the processor 210 may temporarily or permanently store the modified image to which the perturbation data has been applied in the memory 220, separately from the original image obtained through the camera 250. For example, the processor 210 may store the modified image to which the perturbation data has been applied in a JPEG extension of the original image.

According to an embodiment, when the electronic device 101 displays or uses the image, the electronic device 101 may display or use the original image to which perturbation data is not applied on a display 240.

In operation 1070, the processor 210 according to an embodiment may transmit the modified image to which the perturbation data has been applied to the external device in response to the request to transmit the image to the external device.

An electronic device 101 according to an embodiment disclosed herein may include a communication circuit 230, a processor 210, and a memory 220 operatively connected to the processor 210. The memory 220 according to an embodiment may store instructions that, when executed, cause the processor 210 to: recognize an area including at least part of a face in an image to be transmitted to an external device; generate perturbation data about the recognized area based on a machine learning model stored in the memory 220; apply the perturbation data to the recognized area; and transmit the image to which the perturbation data has been applied to the external device.

In the electronic device 101 according to an embodiment disclosed herein, the instructions may further cause the processor 210 to recognize the area including the at least part of the face in the image in response to a request to transmit the image to the external device.

The electronic device 101 according to an embodiment disclosed herein may further include a camera 250. In the electronic device 101 according to an embodiment disclosed herein, the instructions may further cause the processor 210 to recognize the area including the at least part of the face in the image upon obtaining the image through the camera 250.

In the electronic device 101 according to an embodiment disclosed herein, the instructions may further cause the processor 210 to: extract the recognized area; generate the perturbation data about the extracted area; apply the perturbation data to the extracted area; and merge the extracted area to which the perturbation data has been applied and the image.

In the electronic device 101 according to an embodiment disclosed herein, the machine learning model may include a generator of an encoder-decoder type based on a convolutional neural network, and the instructions may further cause the processor 210 to: extract characteristic information about the recognized area through an encoder of the generator; and generate the perturbation data about the recognized area through a decoder of the generator based on the extracted characteristic information.

In the electronic device 101 according to an embodiment disclosed herein, the generator may be trained to relatively reduce the difference between the image to which the perturbation data has been applied and the original image, to relatively reduce the image recognition accuracy of the machine learning model for image recognition, and to relatively reduce the size of the perturbation data.

In the electronic device 101 according to an embodiment disclosed herein, the instructions may further cause the processor 210 to: determine an interest area and a non-interest area of the recognized area based on an attention map method of the machine learning model; and generate the perturbation data about the non-interest area.

In the electronic device 101 according to an embodiment disclosed herein, the machine learning model may include at least one of a convolutional neural network, a recurrent neural network, a deep neural network, or a generative adversarial neural network.

In the electronic device 101 according to an embodiment disclosed herein, the instructions may further cause the processor 210 to determine a level at which the perturbation data is applied to the recognized area based on the type of the external device.

In the electronic device 101 according to an embodiment disclosed herein, the instructions may further cause the processor 210 to: identify a user in the image; and determine a level at which the perturbation data is applied to the recognized area based on the identified user.

In the electronic device 101 according to an embodiment disclosed herein, the instructions may further cause the processor 210 to: identify a person in the image, where the recognized area includes at least part of a face of the person when the identified person is a user of the electronic device 101.

In the electronic device 101 according to an embodiment disclosed herein, the instructions may further cause the processor 210 to recognize an area including at least one of an eye area, a wrist area, or a fingerprint area in the image to be transmitted to the external device.

The electronic device 101 according to an embodiment disclosed herein may further include a display 240. In the electronic device 101 according to an embodiment disclosed herein, the instructions may further cause the processor 210 to display the image to which the perturbation data has been applied and recognition accuracy of the image to which the perturbation data has been applied on the display 240 before transmitting the image to which the perturbation data has been applied to the external device.

An image processing method of an electronic device 101 according to an embodiment disclosed herein may include: recognizing an area including at least part of a face in an image to be transmitted to an external device; generating perturbation data about the recognized area based on a machine learning model; applying the perturbation data to the recognized area; and transmitting the image to which the perturbation data has been applied to the external device.

In the image processing method of an electronic device 101 according to an embodiment disclosed herein, the recognizing may include recognizing the area including the at least part of the face in the image in response to a request to transmit the image to the external device.

In the image processing method of an electronic device 101 according to an embodiment disclosed herein, the recognizing may include recognizing the area including the at least part of the face in the image upon obtaining the image through a camera 250.

In the image processing method of an electronic device 101 according to an embodiment disclosed herein, the machine learning model may include a generator of an encoder-decoder type based on a convolutional neural network. In the image processing method according to various embodiments, the generating may include: extracting characteristic information about the recognized area through an encoder; and generating the perturbation data about the recognized area through a decoder based on the extracted characteristic information.

In the image processing method of an electronic device 101 according to an embodiment disclosed herein, the generator may be trained to reduce the difference between the image to which the perturbation data has been applied and the original image, to reduce the image recognition accuracy of the machine learning model for image recognition, and to reduce the size of the perturbation data.

In the image processing method of an electronic device 101 according to an embodiment disclosed herein, the generating may include: determining an interest area and a non-interest area of the recognized face area based on an attention map method of the machine learning model; and generating the perturbation data about the non-interest area.

In the image processing method of an electronic device 101 according to an embodiment disclosed herein, the applying may include: determining a level at which the perturbation data is applied to the recognized face area based on a type of the external device; and applying the perturbation data to the recognized face area based on the determined level.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    a communication circuit;
    a processor; and
    a memory configured to be operatively connected to the processor,
    wherein the memory stores instructions that, when executed, cause the processor to:
    recognize an area comprising at least part of a face in an image to be transmitted to an external device;
    generate perturbation data about the recognized area based on a machine learning model stored in the memory;
    determine a level of the perturbation data based on a type of the external device;
    apply the perturbation data to the recognized area based on the determined level; and
    transmit the image to which the perturbation data has been applied to the external device.

2. The electronic device as claimed in claim 1, wherein the instructions further cause the processor to recognize the area comprising the at least part of the face in the image in response to a request to transmit the image to the external device.

3. The electronic device as claimed in claim 1, further comprising:
    a camera,
    wherein the instructions further cause the processor to recognize the area comprising the at least part of the face in the image upon obtaining the image through the camera.

4. The electronic device as claimed in claim 1, wherein the instructions further cause the processor to:
    extract the recognized area;
    generate the perturbation data about the extracted area;
    apply the perturbation data to the extracted area; and
    merge the extracted area to which the perturbation data has been applied and the image.

5. The electronic device as claimed in claim 1, wherein the machine learning model comprises a generator of an encoder-decoder type based on a convolutional neural network, and
    wherein the instructions further cause the processor to:
    extract characteristic information about the recognized area through an encoder of the generator; and
    generate the perturbation data about the recognized area through a decoder of the generator based on the extracted characteristic information.

6. The electronic device as claimed in claim 1, wherein the instructions further cause the processor to:
    determine an interest area and a non-interest area of the recognized area based on an attention map method of the machine learning model; and
    generate the perturbation data about the non-interest area.

7. The electronic device as claimed in claim 1, wherein the instructions further cause the processor to:
    identify a person in the image,
    wherein the recognized area includes at least part of a face of the person when the identified person is a user of the electronic device.

8. The electronic device as claimed in claim 1, further comprising:
    a display,
    wherein the instructions further cause the processor to display the image to which the perturbation data has been applied and recognition accuracy of the image to which the perturbation data has been applied on the display before transmitting the image to which the perturbation data has been applied to the external device.

9. An image processing method of an electronic device, the method comprising:
    recognizing an area comprising at least part of a face in an image to be transmitted to an external device;
    generating perturbation data about the recognized area based on a machine learning model;
    determining a level of the perturbation data based on a type of the external device;
    applying the perturbation data to the recognized area based on the determined level; and
    transmitting the image to which the perturbation data has been applied to the external device.

10. The method as claimed in claim 9, wherein the recognizing further comprises recognizing the area comprising the at least part of the face in the image in response to a request to transmit the image to the external device.

11. The method as claimed in claim 9, wherein the recognizing further comprises recognizing the area comprising the at least part of the face in the image upon obtaining the image through a camera.

12. The method as claimed in claim 9, wherein the machine learning model further comprises a generator of an encoder-decoder type based on a convolutional neural network, and wherein the generating further comprises:
extracting characteristic information about the recognized area through an encoder of the generator; and
generating the perturbation data about the recognized area through a decoder of the generator based on the extracted characteristic information.

13. The method as claimed in claim 9, wherein the generating further comprises:
determining an interest area and a non-interest area of the recognized area based on an attention map method of the machine learning model; and
generating the perturbation data about the non-interest area.

14. The method as claimed in claim 9, wherein the applying further comprises:
applying the perturbation data to extracted area; and
merging the extracted area to which the perturbation data has been applied and the image.

15. The method as claimed in claim 9, further comprising:
identifying a person in the image,
wherein the recognized area includes at least part of a face of the person when the identified person is a user of the electronic device.

16. The method as claimed in claim 9, further comprising:
displaying the image to which the perturbation data has been applied and recognition accuracy of the image to which the perturbation data has been applied on a display before transmitting the image to which the perturbation data has been applied to the external device.

* * * * *